(12) United States Patent
Li et al.

(10) Patent No.: US 12,456,551 B2
(45) Date of Patent: Oct. 28, 2025

(54) ATRIAL FIBRILLATION RISK PREDICTION SYSTEM BASED ON HEARTBEAT RHYTHM SIGNALS AND APPLICATION THEREOF

(71) Applicants: HUAZHONG UNIVERSITY OF SCIENCE AND TECHNOLOGY, Hubei (CN); WUHAN ZHONGKE INDUSTRIAL RESEARCH INSTITUTE OF MEDICAL SCIENCE CO., LTD, Hubei (CN); TONGJI HOSPITAL, TONGJI MEDICAL COLLEGE, HUAZHONG UNIVERSITY OF SCIENCE AND TECHNOLOGY, Hubei (CN)

(72) Inventors: Qiang Li, Hubei (CN); Fan Lin, Hubei (CN); Peng Zhang, Hubei (CN); Yuting Chen, Hubei (CN)

(73) Assignees: HUAZHONG UNIVERSITY OF SCIENCE AND TECHNOLOGY, Hubei (CN); WUHAN ZHONGKE INDUSTRIAL RESEARCH INSTITUTE OF MEDICAL SCIENCE CO., LTD, Hubei (CN); TONGJI HOSPITAL, TONGJI MEDICAL COLLEGE, HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 499 days.

(21) Appl. No.: 17/923,916

(22) PCT Filed: Jan. 21, 2022

(86) PCT No.: PCT/CN2022/073248
§ 371 (c)(1),
(2) Date: Nov. 8, 2022

(87) PCT Pub. No.: WO2023/103156
PCT Pub. Date: Jun. 15, 2023

(65) Prior Publication Data
US 2023/0352180 A1 Nov. 2, 2023

(30) Foreign Application Priority Data
Dec. 10, 2021 (CN) .......................... 202111506872.1

(51) Int. Cl.
*G16H 50/30* (2018.01)
*A61B 5/00* (2006.01)
(Continued)

(52) U.S. Cl.
CPC ............. *G16H 50/30* (2018.01); *A61B 5/352* (2021.01); *A61B 5/7203* (2013.01); *G16H 50/20* (2018.01); *G16H 40/67* (2018.01)

(58) Field of Classification Search
CPC ........ G16H 50/30; G16H 50/20; G16H 40/67; G16H 40/63; A61B 5/352; A61B 5/7203;
(Continued)

(56) References Cited

U.S. PATENT DOCUMENTS 10,251,576 B2 * 4/2019 Bardy ................ A61B 5/02405
11,678,831 B2 * 6/2023 Fontanarava ........ A61B 5/7275
600/518
(Continued)

FOREIGN PATENT DOCUMENTS

CA 3151064 A1 * 3/2021 ........... G06N 3/0464
CN 109390054 2/2019
(Continued)

OTHER PUBLICATIONS

Espacenet English machine translation for CN113491508 to Miao et al published Oct. 12, 2021, and accessed on May 19, 2025. (Year: 2021).*
(Continued)

*Primary Examiner* — Jeffrey G. Hoekstra
(74) *Attorney, Agent, or Firm* — JCIPRNET

(57) ABSTRACT

The invention provides an atrial fibrillation risk prediction system based on heartbeat rhythm signals. A heartbeat rhythm signal preprocessing module obtains heartbeat interval sequence data by calculating the time interval of two adjacent heartbeats. During sample labeling, a positive sample is from heartbeat interval data during the sinus heart rate period of a case with high AF risk, and a negative sample is from heartbeat interval data of a case with low AF risk; and an atrial fibrillation risk prediction model is trained with positive and negative samples and is used to test heartbeat interval data, an AF risk curve between the proportion of positive samples and output probability thresholds is obtained according to the output probabilities of testing samples, the area under the AF risk curve is calculated as the atrial fibrillation risk value, and the value can reflect the atrial fibrillation risk.

10 Claims, 3 Drawing Sheets

(51) Int. Cl.
  *A61B 5/352* (2021.01)
  *G16H 40/67* (2018.01)
  *G16H 50/20* (2018.01)

(58) Field of Classification Search
  CPC ..... A61B 5/7264; A61B 5/7275; A61B 5/361; A61B 5/7267; A61B 5/318
  See application file for complete search history.

(56) References Cited

U.S. PATENT DOCUMENTS

| | | |
|---|---|---|
| 2015/0327781 A1 | 11/2015 | Hernadez-Silveira et al. |
| 2017/0049403 A1* | 2/2017 | Ong .......................... G06N 3/08 |
| 2019/0133480 A1 | 5/2019 | Rahman et al. |

FOREIGN PATENT DOCUMENTS

| | | | |
|---|---|---|---|
| CN | 113343805 | 9/2021 | |
| CN | 113491508 | 10/2021 | |
| WO | WO-2019241444 A1 * | 12/2019 | ............. G16H 50/70 |

OTHER PUBLICATIONS

"International Search Report (Form PCT/ISA/210) of PCT/CN2022/073248", mailed on Aug. 17, 2022, pp. 1-5.
"Written Opinion of the International Searching Authority (Form PCT/ISA/237) of PCT/CN2022/073248", mailed on Aug. 17, 2022, pp. 1-4.

* cited by examiner

ATRIAL FIBRILLATION RISK PREDICTION SYSTEM BASED ON HEARTBEAT RHYTHM SIGNALS AND APPLICATION THEREOF

CROSS-REFERENCE TO RELATED APPLICATION

This application is a 371 of international application of PCT application serial no. PCT/CN2022/073248, filed on Jan. 21, 2022, which claims priority to Chinese Patent Application No. 202111506872.1, filed on Dec. 10, 2021. The entirety of each of the above mentioned patent applications is hereby incorporated by reference herein and made a part of this specification.

BACKGROUND

Technical Field

The invention relates to the field of physiological signal and electrocardiographic (ECG) signal analysis, and particularly, to an atrial fibrillation risk prediction system based on heartbeat rhythm signals and its application therefore.

Description of Related Art

Atrial fibrillation (AF) is one of the most common arrhythmias characterized by rapid and irregular atrial beats. There are about 33.5 million people worldwide affected by AF. The number of elderly patients with AF is larger, and the AF incidence in men is higher than that in women. AF is one of the main causes of stroke and heart failure, and can reduce the quality of life and physical ability. Undiagnosed and untreated AF may be a risk factor for dizziness, shortness of breath, or stroke. AF may also induce sudden cardiovascular diseases. In addition, due to hospitalization and medical services, the cost and clinical burden of detecting and treating AF is heavy. Therefore, it is of great clinical significance and economic value to predict the risk of AF in advance, intervene and treat AF as early as possible, and avoid the occurrence of AF and related complications.

Clinically, cardiac monitoring equipment, such as event recorders or Holter monitors, is usually used to record long-term ECG signals for AF screening. After recording the ECG signal of a subject, clinician manually checks the ECG signal to determine whether AF occurs. In recent years, with the development of artificial intelligence (AI) algorithms, more and more automatic AF detection algorithms have been applied in AF screening.

Currently, most intelligent algorithms related to AF are algorithms for identifying AF episodes. These methods can detect the existence of AF only when the patient is suffering from AF; It is impossible to detect patients with paroxysmal AF who have had AF before but is not suffering from AF at the time of detection, or patients who are still in the embryonic stage of AF and do not have AF completely. However, there has been evidence that for patients at risk of AF, there are some subtle changes even in normal ECG signals, due to changes in the structure of the atrium. Moreover, by identifying such subtle changes, it is possible to predict the risk of AF in advance before the onset of AF.

Existing methods can only detect AF by analyzing the ECG recorded with AF episode signals, or predict the risk of AF through the ECG waveform data, which limits certain applications.

SUMMARY

Regarding the defects and improvement requirements of the prior art, the invention provides an AF risk prediction system based on heartbeat rhythm signals and its application. The purpose is to propose a more concise and convenient system for predicting the risk of AF, which aims to provide a method for predicting the AF risk several days to two years in advance according to the characteristics of the heartbeat rhythm information.

To attain the purpose, according to an aspect of the invention, an AF risk prediction system based on heartbeat rhythm signals is provided. The AF risk prediction system based on heartbeat rhythm signals includes:

(1) a heartbeat rhythm signal preprocessing module. This module was used to extract the RR interval value between two consecutive heartbeats in the heartbeat rhythm signals to obtain the RR interval sequence. Then, the RR interval sequence was preprocessed to remove outliers and sampled with a non-overlapping sliding window to obtain multiple RR interval samples.

(2) a sample annotation and model training module. The extracted RR interval samples can be labeled into two categories, including latent AF (LAF) that has high AF risk and non-AF (NAF) that has low AF risk. The former is labeled as positive and the latter as negative. The invention further proposes a CNN-LSTM deep learning model as an AF risk prediction model, which combines convolutional neural network (CNN) blocks with long and short term memory neural network (LSTM). The model uses the extracted RR interval sample as input and the corresponding sample label as output. During model training, the cross entropy loss function is used to measure the similarity between the model prediction probability and the corresponding label.

(3) AF risk prediction module. After preprocessing in the heartbeat rhythm signal preprocessing module, a series of RR interval samples are obtained. The obtained samples are input into the trained AF risk prediction model to obtain the output probability of each RR interval input sample. According to these output probabilities, a risk curve can be drawn, where the X-axis is the threshold from 0 to 1, and the Y-axis is the proportion of the output probability exceeding the corresponding X-axis. The area under the risk curve is calculated as the AF risk value and used to determine the AF risk of the corresponding heartbeat rhythm signals to be detected.

Furthermore, before dividing RR interval sequence into RR interval samples, the heartbeat rhythm signal preprocessing module is further configured to preprocess the RR interval sequence to remove outliers.

Furthermore, the outliers include noise and the RR intervals greater than 2000 ms or less than 200 ms.

Furthermore, the steps to divide RR interval sequence are as follows: based on a non-overlapping sliding window, the RR interval sequence is divided from its initial position to obtain the RR interval samples, and after each division, the sliding window is moved forward by one window for a next division.

Furthermore, the LAF patients refer to those who have not been diagnosed with AF at present, but were diagnosed with AF later (several days to two years). The NAF patients refer to the patients who have not been diagnosed as AF.

The recordings were from AF patients, while AF episodes were not found in current recording but in historical or future recordings.

Furthermore, the atrial fibrillation risk prediction model includes a cascaded convolutional neural network, a bidirectional long-short-term memory neural network, and a fully connected network; the convolutional network is configured to extract local features in the RR interval samples; the bidirectional long-short-term memory neural network is composed of two long-short-term memory neural networks with opposite directions and configured for time series analysis of the local features of the RR interval samples; and the fully connected network is configured for a final mapping classification of the model.

Furthermore, a cross entropy loss function is adopted to measure the similarity between the model prediction probability and the corresponding label when training the atrial fibrillation risk prediction model; parameters in the atrial fibrillation risk prediction model are updated by the Adam optimizer.

Furthermore, the convolution network includes three convolution layers, and its convolution kernel size and the number of the convolution kernels are 5*1*32, 3*1*64, 3*1*128, respectively; the number of basic neurons of the bidirectional long-short-term memory neural network is 128; the fully connected network consists of two fully connected layers, each with 32 neurons.

Furthermore, in drawing the risk curve, X-axis is the threshold from 0 to 1. The RR interval sample with an output probability greater than this threshold is regarded as a positive sample, so as to obtain the proportion of positive samples in all samples for this threshold, which is the corresponding value of Y-axis. For each threshold in X-axis, a corresponding value in Y-axis can be obtained, therefore, the risk curve can be drawn.

Furthermore, the heartbeat rhythm signals are from an ECG or a wearable device.

The invention further provides an AF risk prediction device including a processor and a machine-readable storage medium. The machine-readable storage medium stores machine-executable instructions executed by the processor. The processor executes the machine-executable instructions to implement specific functions of the AF risk prediction system based on heartbeat rhythm signals according to the foregoing description.

The invention further provides a computer-readable storage medium. The computer-readable storage medium includes a stored computer program. When the computer program is run by the processor, a device where the storage medium is located is controlled to perform specific functions of the AF risk prediction system based on heartbeat rhythm signals according to the foregoing description.

In general, with the technical solutions conceived by the invention, beneficial effects can be achieved as follows.

(1) The invention provides an AF risk prediction system based on sinus heart rate and heartbeat rhythm signals, which can identify subtle changes in heartbeat rhythm information caused by high-risk factors related to AF during sinus heart rate period. Compared with AF detection methods, the invention is not limited to identifying the signal of the AF episodes but can predict the AF risk before the onset of AF only with the heartbeat rhythm information of sinus heart rate. More importantly, this invention can predict the AF risk several days to two years before the onset of actual AF. Therefore, the invention can screen out high-risk groups of AF and carry out early intervention and treatment, which has great contribution to clinical applications.

(2) The invention provides an AF risk prediction system based on sinus heart rate and heartbeat rhythm signals, which is convenient, fast and has small computational burden. With simply the heartbeat interval information, the AF risk prediction can be implemented. Moreover, the system can not only be adapted for the dynamic ECG but also applied to other scenarios where long-term heartbeat interval sequences can be obtained, like various wearable devices such as smart watches and bracelets. When in use, only the heartbeat rhythm signals need to be processed to obtain the RR interval samples for inputting into the AF risk prediction model. The AF risk value can be obtained, that is the AF prediction results, according to the output results of the model.

(3) The AF risk value proposed by the invention is an overall evaluation of the heartbeat rhythm signals of the patient collected within a period of time. Through the AF risk curve and the AF risk value, the risk of AF in different patients can be accurately reflected.

DESCRIPTION OF THE EMBODIMENTS

In order to make the objectives, technical solutions, and advantages of the invention clearer, embodiments accompanied with drawings are described to illustrate the invention in detail below. It should be understood that the specific embodiments described here are only configured to explain the invention, but not to limit the invention. In addition, the technical features involved in the various embodiments of the invention described below can be combined with each other as long as they do not conflict with each other.

When taking into account that with the conventional technology, atrial fibrillation (AF) may only be detected by analyzing the ECG signals that have recorded AF episodes, or the risk of AF can only be predicted through raw ECG waveform data. However, the invention proposes a method for predicting the risk of AF, which does not need to capture the AF episode signals, nor rely on the raw ECG waveform, but only requires ordinary heartbeat rhythm information. That is, the invention provides an automatic atrial fibrillation risk prediction system based on heartbeat rhythm information, and its entire concept is as follows. In the heartbeat rhythm information preprocessing module, RR interval sequence data are obtained by calculating the time interval between two adjacent heartbeats, without any other complex feature extraction methods. In sample annotation, the positive samples are from the RR interval data during the sinus heart rate period of the LAF patients, and negative samples are from RR interval data of NAF patients. The positive samples can also be replaced by the non-AF part of the RR interval data of paroxysmal AF patients, and the negative samples can be from the RR interval data of patients with other arrhythmia, or the healthy people, thereby further increasing the number of samples. The AF risk prediction model is trained with the positive and negative samples and then is used to test heartbeat interval data. The AF risk value can reflect the overall situation of the heartbeat interval data of a patient, and can predict the risk of AF accurately.

Embodiments are illustrated as follows.

Figure 1:
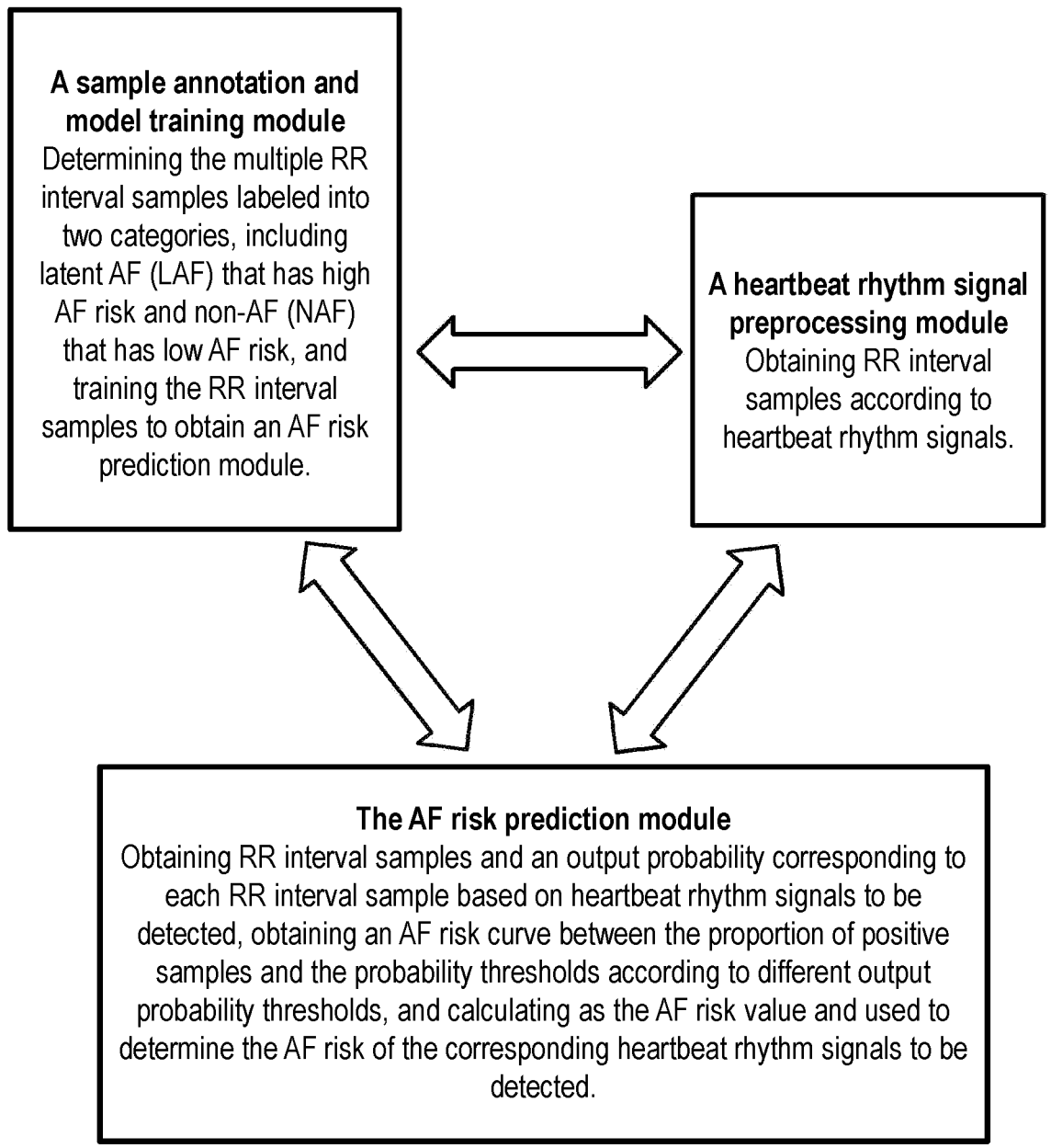
FIG. 1 is a schematic structural view of an atrial fibrillation risk prediction system based on heartbeat rhythm signals according to the embodiment of the invention.

An automatic atrial fibrillation risk prediction system based on heartbeat rhythm signals, as shown in FIG. 1, includes the following.

(1) A heartbeat rhythm signal preprocessing module is configured to extract the RR interval value between two consecutive heartbeats in the heartbeat rhythm signals and obtain the RR interval sequence. Multiple RR interval samples are obtained by dividing the RR interval sequence equally.

After acquiring the heartbeat rhythm information of a period of time, time interval data between two consecutive heartbeats are obtained, and then a sliding time window is designed for sampling. Take ECG signal as an example, detect the R wave peak of the collected ECG signal, extract the R peak time of each heartbeat in the ECG signal, calculate the RR interval value between adjacent R peaks, and obtain the RR interval sequence. Then, the RR interval sequence is preprocessed, for example, outliers are removed, and the preprocessed RR interval sequence is sampled from its initial time based on the sliding window to obtain the RR interval samples. After each extraction, the sliding window is moved forward one window size for the next extraction to achieve non-overlapping sampling. The reason for such a process is that the R peak is the most easily recognized feature in the ECG due to its large amplitude, and the detected R peak has higher noise resistance; in addition, the RR interval represents the change of heart rate to a certain extent, without requiring more other features.

Optionally, in the embodiment, the outliers in the RR interval sequence include noise and RR interval values greater than 2000 ms or less than 200 ms. The size of the sliding window is 90 RR intervals, that is, 90 heartbeats. When the remaining data length of the RR interval sequence is less than the size of the sliding window, it is discarded, and all RR interval samples including the outliers are discarded.

(2) A sample annotation and model training module is configured to obtain several heartbeat rhythm signals with two types of labels, including LAF and NAF, which are input into the heartbeat rhythm signal preprocessing module to obtain several groups of RR interval samples.

Each group includes multiple RR interval samples; each RR interval sample and the corresponding label constitute a training sample for training the AF risk prediction model.

The RR interval samples extracted from the heartbeat signals of different patients can be divided into two categories. One is the high risk of AF, and the other is the low risk of AF. The former is labeled as positive and the latter as negative. In the embodiment, a CNN-LSTM model is further proposed as an AF risk prediction model, which combines a convolutional neural network (CNN) block with a long-short-term memory neural network (LSTM). The model takes the extracted RR interval samples as the input and the corresponding labels as the output. In addition, the cross entropy loss function was adopted to measure the similarity between the model prediction probabilities and the corresponding labels to obtain a trained atrial fibrillation risk prediction model.

Figure 2:
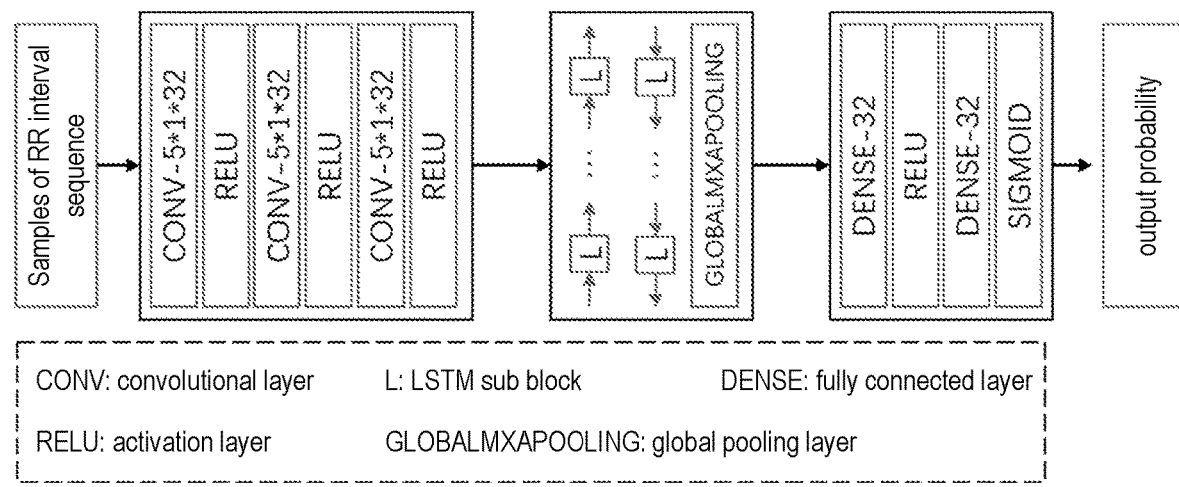
FIG. 2 is a schematic structural view of an atrial fibrillation risk prediction model based on a CNN-LSTM according to the embodiment of the invention.

Specifically, furthermore, as shown in FIG. 2, the AF risk prediction model is composed of a cascaded convolutional network, a bidirectional LSTM network, and a fully connected network. The convolutional network is configured to extract local features in the RR interval samples, which includes three convolutional layers, and its convolution kernel size and the number of convolution kernels are 5*1*32, 3*1*64, and 3*1*128, respectively. The bidirectional LSTM network is composed of two LSTMs with opposite directions, which are used for time series analysis of the features of the samples in the heartbeat interval, and the number of basic neurons is 128. The fully connected network is composed of two fully connected layers each with 32 neurons, which are used for the final mapping classification of the model. The loss function of the AF risk prediction model is the cross entropy function, specifically, $$L = \frac{1}{N}\sum_i -[y_i \cdot \log(p_i) + (1 - y_i) \cdot \log(1 - p_i)],$$

where $y_i$ represents the label of the RR interval sample i, $p_i$ represents the prediction probability of the AF risk prediction model for the RR interval sample i, and N represents the total number of RR interval samples. During training, the parameters in the AF risk prediction model are updated by the Adam optimizer.

In the embodiment of the invention, a total of 3,000,000 RR interval samples are extracted from the 24-hour Holter recordings of 1,000 paroxysmal AF patients, 1,000 LAF patients, and 1,000 NAF patients as the training set. The positive and negative samples are balanced by downsampling and then are used for training the atrial fibrillation risk prediction model.

(3) The AF risk prediction model is configured to input heartbeat rhythm signals into the heartbeat rhythm signal preprocessing module to obtain multiple RR interval samples and input the multiple RR interval samples into the AF risk prediction model to obtain the output probability corresponding to each RR interval sample. According to different output probability thresholds, an AF risk curve between the proportion of positive samples and the probability thresholds is obtained. The area under the risk curve is calculated as the AF risk value and used to determine the AF risk of the corresponding heartbeat rhythm signals to be detected.

The heartbeat signals of a patient is preprocessed to obtain a series of RR interval samples, the obtained RR interval samples are input into the trained AF risk prediction model to obtain the output probability of each sample, and different output probability thresholds are set. Therefore, An AF risk curve between the proportion of positive samples and the probability thresholds is obtained. The area under the risk curve is calculated as the AF risk value and used to determine the AF risk of the corresponding heartbeat rhythm signals to be detected.

Figure 3:
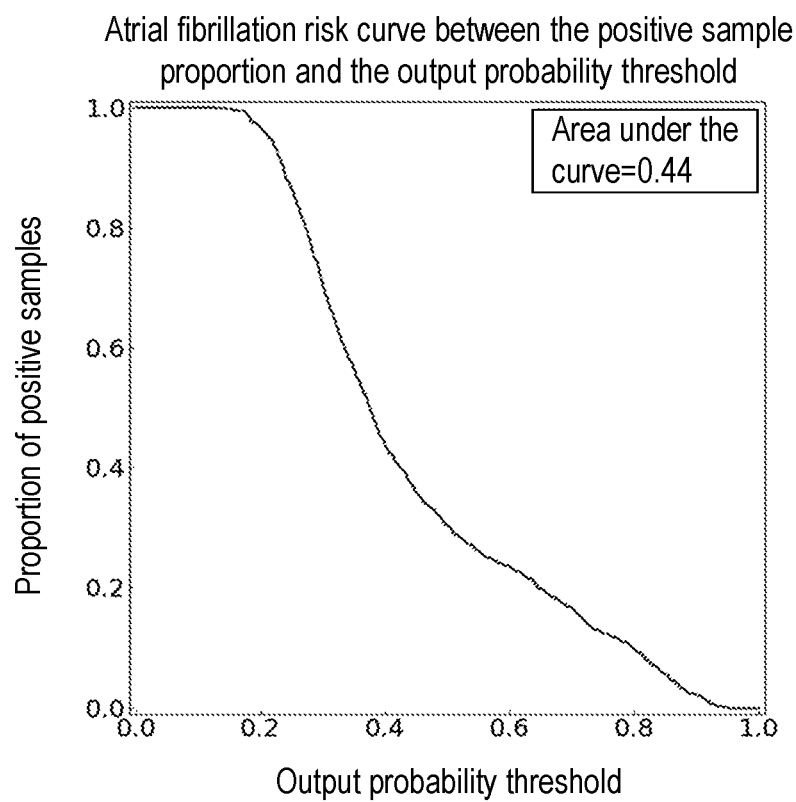
FIG. 3 illustrates an atrial fibrillation risk curve between a ratio of positive samples and a probability threshold based on different probability thresholds according to the embodiment of the invention.

Preferably, as shown in FIG. 3, the set probability thresholds are a series of values from 0 to 1, and the RR interval samples whose output probability is greater than the threshold value are regarded as positive samples, thereby obtaining the proportion of positive samples in all samples. When the output probability threshold changes, the proportion of positive samples will also change, thereby gaining the AF risk curve between the proportion of positive samples and the output probability thresholds. The area under the AF risk curve is the AF risk value of the patient.

Optionally, in the embodiment, the selected probability thresholds are 50,000 values ranging from 0 to 1, corresponding to 50,000 proportions of positive samples, and the area under the AF risk curve is the AF risk value.

To further verify the effectiveness of the AF risk prediction model trained in the embodiment, 24-hour Holter recordings from 627 paroxysmal AF patients, 2,352 LAF patients, 19,823 NAF patients, and 628 healthy people are tested, respectively. All the test data are not previously seen during model training. For paroxysmal AF patients, only the non-AF part of the data is tested. When the AF risk value exceeds 0.485 (the value is obtained from the validation set), the patient is considered to have a high AF risk.

Table 1 shows the testing results of the above testing data. The AF risk value gradually increased from healthy people to Paroxysmal AF patients, which is consistent with the real AF risk in these patients. Moreover, the prediction accuracy shows that the positive and negative cases can be effectively classified. The heartbeat signals of patients with different AF risks are different to a certain extent, therefore, the AF risk can be predicted according to this subtle difference.

TABLE 1

Test results of different types of patients

| Types of patients | Atrial fibrillation risk value | Prediction accuracy |
|---|---|---|
| Paroxysmal AF | 0.586 ± 0.102 | 83.7% |
| LAF | 0.544 ± 0.085 | 75.2% |
| NAF | 0.457 ± 0.080 | 67.9% |
| Healthy individuals | 0.414 ± 0.055 | 91.6% |

In summary, through the conventional technology, AF may only be detected by analyzing the ECG signals that have recorded AF episodes, or the risk of AF can be predicted through raw ECG waveform data. However, the invention proposes a method for predicting the risk of AF, which does not need to capture the AF episode signals, nor rely on the raw ECG waveform, but only requires ordinary heartbeat rhythm information. Moreover, the method can identify the subtle features existing in the heartbeat rhythm signals through a designed deep learning algorithm to predict AF risk, which is automatic and widely applicable. The key technical means of the invention is that only a series of RR interval samples of the patient are input into the AF risk prediction model, the output probability of each sample is obtained, and the AF risk value can be calculated to determine the AF risk of the patient. The AF risk prediction model is specially developed for RR interval samples. The AF risk value is an overall evaluation of the heartrate signals of patients collected over a period of time, which can accurately reflect the AF risk of the patients, thus realizing the method of predicting AF risk only using the heart rhythm signals.

Note that in the invention, the heartbeat rhythm information during sinus heart rate is used to predict the AF risk. Therefore, the invention may be not only adapted for the dynamic ECG, but also applied to other scenarios where long-term RR interval sequences can be obtained, such as smart watches, wristbands, and other wearable devices that can record heartbeat information. When in use, only the heartbeat rhythm signals need to be processed to obtain the RR interval samples for inputting into the AF risk prediction model. The AF risk value can be obtained, that is the AF prediction results, according to the output results of the model.

Those skilled in the art can easily understand that the foregoing descriptions are only the preferred embodiments of the invention and are not intended to limit the invention. Any modification, equivalent replacement and improvement, and so on made within the spirit and principle of the invention shall be included in the protection scope of the invention.

What is claimed is:

1. An atrial fibrillation risk prediction system based on heartbeat rhythm signals, comprising:
   a processor, wherein the processor is configured to:
   extract an RR interval value between two consecutive heartbeats in the heartbeat rhythm signals and obtain the RR interval sequence, wherein the RR interval sequence is divided equally to obtain a plurality of RR interval samples, wherein the RR interval represents a time interval between two successive R waves in an electrocardiogram (ECG);
   obtain several heartbeat rhythm signals with two types of labels, including a latent atrial fibrillation (LAF) and a non-atrial fibrillation (NAF), which are input into the processor to obtain several groups of RR interval samples, wherein each group comprises a plurality of RR interval samples, each RR interval sample and the corresponding label constitute a training sample configured to train and obtain an atrial fibrillation (AF) risk prediction model, wherein the AF risk prediction model comprises a cascaded convolutional neural network, a bidirectional long-short-term memory neural network, and a fully connected network; and
   execute the AF risk prediction model to input heartbeat rhythm signals into the processor to obtain a plurality of RR interval samples, and input the plurality of RR interval samples into the AF risk prediction model to obtain the output probability corresponding to each RR interval sample, wherein according to different output probability thresholds, an AF risk curve between the proportion of positive samples and the probability thresholds is obtained;
   wherein the area under the risk curve is calculated as the AF risk value and used to determine the AF risk of the corresponding heartbeat rhythm signals to be detected.

2. The AF risk prediction system according to claim 1, wherein before performing RR sequence division, the processor is further configured to preprocess the RR interval sequence to remove outliers.

3. The AF risk prediction system according to claim 2, wherein the outliers comprise noise and the RR interval values greater than 2000 ms or less than 200 ms.

4. The AF risk prediction system according to claim 1, wherein the step of dividing RR sequence is implemented as follows:
   the preprocessed RR interval sequence is sampled from its initial time based on the sliding window to obtain the RR interval samples;
   after each extraction, the sliding window is moved forward one window size for the next extraction to achieve non-overlapping sampling.

5. The AF risk prediction system according to claim 1, wherein
   the convolutional network is configured to extract local features in the RR interval samples;
   the bidirectional long-short-term memory neural network is composed of two long-short-term memory neural networks with opposite directions and configured for time series analysis of the local features of the RR interval samples;
   the fully connected network is configured for a final mapping classification of the model.

6. The AF risk prediction system according to claim 5, wherein a cross entropy loss function is adopted to measure a similarity between the model prediction probabilities and the corresponding labels when training the AF risk prediction model; parameters in the AF risk prediction model are updated by an adaptive moment estimation (Adam) optimizer.

7. The AF risk prediction system according to claim 5, wherein the convolution network comprises three convolution layers, and its convolution kernel size and the number of the convolution kernels are 5*1*32, 3*1*64, 3*1*128, respectively; the number of basic neurons of the bidirectional long-short-term memory neural network is 128; the fully connected network consists of two fully connected layers each with 32 neurons.

8. The AF risk prediction system according to claim 1, wherein the heartbeat rhythm signals are from an ECG or a wearable device.

9. An atrial fibrillation risk prediction device, comprising a processor and a machine-readable storage medium, wherein the machine-readable storage medium stores machine-executable instructions executed by the processor, the processor executes the machine-executable instructions to implement specific functions of the atrial fibrillation risk prediction system based on heartbeat rhythm signals according to claim 1.

10. A computer-readable storage medium, wherein the computer-readable storage medium comprises a stored computer program, wherein when the computer program is run by the processor, a device where the storage medium is located is controlled to perform specific functions of the atrial fibrillation risk prediction system based on heartbeat rhythm signals according to claim 1.

* * * * *